(12) United States Patent
Zimmermann et al.

(10) Patent No.: US 12,017,630 B2
(45) Date of Patent: Jun. 25, 2024

(54) METHOD AND CONTROL APPARATUS FOR AVOIDING JOLT MOMENTS DURING A DECELERATION OF A VEHICLE

(71) Applicants: Continental Automotive Technologies GmbH, Hannover (DE); Nissan Motor Co. Ltd., Kanagawa (JP)

(72) Inventors: Jochen Zimmermann, Frankfurt am Main (DE); Takeshi Katayama, Kanagawa (JP)

(73) Assignees: Continental Automotive Technologies GmbH, Hannover (DE); Nissan Motor Co. Ltd., Kanawawa (JP)

( * ) Notice: Subject to any disclaimer, the term of this patent is extended or adjusted under 35 U.S.C. 154(b) by 311 days.

(21) Appl. No.: 17/439,278

(22) PCT Filed: Mar. 11, 2020

(86) PCT No.: PCT/EP2020/056523
§ 371 (c)(1),
(2) Date: Sep. 14, 2021

(87) PCT Pub. No.: WO2020/187667
PCT Pub. Date: Sep. 24, 2020

(65) Prior Publication Data
US 2022/0176926 A1 Jun. 9, 2022

(30) Foreign Application Priority Data
Mar. 15, 2019 (DE) ..................... 10 2019 203 573.6

(51) Int. Cl.
*B60T 13/14* (2006.01)
*B60T 7/04* (2006.01)
(Continued)

(52) U.S. Cl.
CPC .............. *B60T 8/344* (2013.01); *B60T 7/042* (2013.01); *B60T 8/30* (2013.01); *B60T 13/146* (2013.01);
(Continued)

(58) Field of Classification Search
CPC . B60T 8/30; B60T 8/344; B60T 7/042; B60T 13/146; B60T 13/686; B60T 2230/04
(Continued)

(56) References Cited

U.S. PATENT DOCUMENTS 9,139,171 B2    9/2015   Knechtges
10,131,333 B2  11/2018   Feigel et al.
(Continued)

FOREIGN PATENT DOCUMENTS

DE        10055384 A1    6/2002
DE   102006034357 A1    1/2008
(Continued)

OTHER PUBLICATIONS

International Search Report and Written Opinion for International Application No. PCT/EP2020/056523, with partial English translation, dated Oct. 1, 2020. 7 pages.
(Continued)

*Primary Examiner* — Christopher P Schwartz
(74) *Attorney, Agent, or Firm* — Buchanan Ingersoll & Rooney

(57) ABSTRACT

A method for reducing jolt moments during a deceleration of a vehicle by a braking system, the braking system having at least one electrically actuatable pressure supply device, hydraulic wheel brakes and a valve device. The valve device is designed to apply a pressure provided by the pressure supply device to a selectable subset of the wheel brakes. The method includes: determining a braking requirement, determining a vehicle speed, checking whether the vehicle speed
(Continued)

Fig. 1 is below a defined threshold value, and if the vehicle speed is below the threshold value, selecting the subset of wheel brakes and applying a pressure provided by the pressure supply device to only the subset of wheel brakes, the pressure being determined according to the selected subset of wheel brakes.

9 Claims, 3 Drawing Sheets

(51) Int. Cl.
    *B60T 8/30*   (2006.01)
    *B60T 8/34*   (2006.01)
    *B60T 13/68*  (2006.01)
(52) U.S. Cl.
    CPC ......... *B60T 13/686* (2013.01); *B60T 2230/04* (2013.01)
(58) Field of Classification Search
    USPC .................................................. 303/191, 192
    See application file for complete search history.

(56) References Cited

U.S. PATENT DOCUMENTS

| | | |
|---|---|---|
| 2007/0182243 A1 | 8/2007 | Osborn et al. |
| 2018/0056953 A1 | 3/2018 | Kato |
| 2021/0179051 A1* | 6/2021 | Alford .................. B60T 13/142 |

FOREIGN PATENT DOCUMENTS

| | | | |
|---|---|---|---|
| DE | 102006046029 A1 * | 4/2008 | .............. B60T 13/74 |
| DE | 102013224870 A1 | 9/2014 | |
| JP | 2004142510 A | 5/2004 | |
| JP | 2018034537 A | 3/2018 | |

OTHER PUBLICATIONS

English Translation of Japanese Notice of Reasons for Refusal for Japanese Application No. 2021-555205, dated Sep. 20, 2023, 3 pages.

* cited by examiner

METHOD AND CONTROL APPARATUS FOR AVOIDING JOLT MOMENTS DURING A DECELERATION OF A VEHICLE

CROSS REFERENCE TO RELATED APPLICATIONS

This application is the U.S. National Phase Application of PCT International Application No. PCT/EP2020/056523, filed Mar. 11, 2020, which claims priority to German Patent Application No. 10 2019 203 573.6, filed Mar. 15, 2019, the contents of such applications being incorporated by reference herein.

FIELD OF THE INVENTION

The present invention relates to a method for avoiding jerking moments during deceleration of a vehicle by means of a brake system and to a corresponding control unit for a brake system of a vehicle.

BACKGROUND OF THE INVENTION

Modern motor vehicles are increasingly being fitted with driving functions that assist the driver in the usual tasks involved in driving the motor vehicle, or even relieve the driver completely of these tasks. These include, for example, functions such as automatic parking functions or adaptive cruise control functions (ACC). Often provided among the equipment for performing such assistance functions in hydraulic brake systems is an electrically operable pressure-providing device, often a dual-circuit piston pump and valves, by which brake pressures can be actively set individually for each wheel in the respective wheel brakes of the vehicle.

In particular in the case of an automatic parking function, very precise control of the vehicle, and in particular its speed, is necessary, since collisions with stationary objects can occur if there is insufficient accuracy of the control. At the same time, it is intended to avoid jerky movements of the vehicle, since they are found to be troublesome or unpleasant for a driver of the vehicle. Because of the very low speeds during a parking maneuver, often only very low brake pressures in the range of 10 to 20 bar are needed in the wheel brakes of the brake system to decelerate the vehicle. Because of the combination used for controlling the brake pressure of a piston pump and valves, which at low pressures can often only control the brake pressure in the wheel brakes with an accuracy of 3 to 8 bar, it is however always possible for jerky decelerations of the vehicle to occur during a slow parking maneuver.

SUMMARY OF THE INVENTION

Against this background, an aspect of the present application is based on the technical problem of providing a method for avoiding jerking moments during deceleration of the vehicle and a corresponding control unit.

In a first aspect, the invention relates to a method for avoiding jerking moments during deceleration of a vehicle by means of a brake system, the brake system having at least one electrically operable pressure-providing device, a plurality of hydraulic wheel brakes, which are connected to the pressure-providing device and respectively assigned to a wheel of the vehicle, and a valve device. In this case, the valve device is designed to apply a pressure provided by the pressure-providing device to a selectable subset of the wheel brakes. In the course of the method, first a braking requirement is established. Subsequently, the vehicle speed is determined and it is checked whether the vehicle speed lies below a defined limit value. If the vehicle speed lies below the limit value, a subset of the wheel brakes is selected and a pressure is applied by the pressure-providing device exclusively to the subset of the wheel brakes, the pressure being fixed according to the selected subset of the wheel brakes.

The method according to an aspect of the invention is based on the idea that, when using a subset of the wheel brakes, a smaller number of wheel brakes have to be used to apply the force that is to be applied altogether for decelerating the vehicle. Consequently, compared with using all of the wheel brakes of the vehicle for braking, a higher brake pressure has to be set in these wheel brakes to achieve a corresponding deceleration. However, in this case the absolute accuracy with which the brake pressure is produced by the pressure-providing device does not change, or only slightly, as compared with using all of the wheel brakes of the vehicle for braking. Consequently, as a result of the higher brake pressure in the wheel brakes for the same deceleration of the vehicle, there is a smaller relative deviation of the actual brake pressure from a target brake pressure, because of the unchanging absolute accuracy of the provision of pressure. As a direct consequence of this, jerking moments caused by brake pressures deviating disproportionately from a target brake pressure during deceleration of the vehicle are effectively avoided.

Apart from taking into account the actual number of wheel brakes in the subset when fixing the pressure, it may also be provided that the position of the wheel brakes in the vehicle is taken into account when fixing the pressure, in particular while taking into account a direction of movement of the vehicle. The fixing of the pressure may also take into consideration other boundary conditions.

A "subset of the wheel brakes" should in this case be understood as meaning any set of wheel brakes in which at least one wheel brake of the vehicle is not included. The subset of the wheel brakes may well in this case also consist of a single wheel brake of the vehicle. This is so because, at a low speed of the vehicle, reliable deceleration of the vehicle can already be ensured by a single wheel brake.

According to an aspect of the invention, a number of limit values may also be provided, a smaller number of wheel brakes being assigned to the subset of wheel brakes for decelerating the vehicle when the speed of the vehicle is decreasing.

The braking requirement may be ascertained for example by reading a brake pedal sensor or a pressure sensor of the brake system.

According to a preferred embodiment, however, it is provided that the braking requirement is a braking requirement specified by an automatic driving function, in particular an automatic parking aid. In this case, the braking requirement is output by a control unit designed for implementing the driving assistance function.

Preferably, usual braking control functions, such as for example antilock control, can remain in force even when using a subset of the wheel brakes for braking. In this case it may also be provided in particular that if, as a result of a reduced friction coefficient between a wheel and the roadway, increased wheel slip is established for a wheel of which the wheel brake is included in the selected subset of wheel brakes, it is checked whether greater deceleration is possible by using other wheel brakes that are not being used at the time for decelerating the vehicle. If this is the case, the assignment of wheel brakes to the subset can be correspondingly adapted.

According to a preferred embodiment, the method also comprises establishing a driving operating mode, the limit value of the vehicle speed being fixed by the driving operating mode that is established. A driving operating mode should be understood in this case as meaning for example a selected driving stage of an automatic transmission (reverse gear) or an activated driver assistance function, such as for example an automatic parking aid. In this way, the limit value of the vehicle speed from which a subset of the wheel brakes is selectively used for deceleration can be automatically adapted to the corresponding driving situation. For example, it may be fixed for an automatic parking maneuver that, when a vehicle speed goes below 5 km/h, deceleration is only to be performed by means of a subset of the wheel brakes.

According to a further embodiment, the decelerating action during deceleration by the subset of wheel brakes can in this case be improved by the method also comprising the determination of a direction of movement of the vehicle, the subset of the wheel brakes being selected according to the direction of movement determined. Thus, for example, when there is a movement of the vehicle in the forward direction, it may be provided that the wheel brakes of the front axle are assigned to the subset of wheel brakes, whereas, when there is a movement in the reverse direction, the wheel brakes of the rear axle are assigned to the subset of wheel brakes. This is so because the dynamic wheel load distribution during deceleration of the vehicle has the effect that greater deceleration of the vehicle is possible by using the wheel brakes arranged at the front in the driving direction on account of the increased wheel load.

Joint consideration of the driving direction (forward/reverse), which can be determined for example from the gear selected or by wheel speed sensors, and the steering angle may also have the consequence that deceleration by using a single wheel brake is provided. If, for example, the vehicle is in motion in the forward direction and the steering is turned to the right, deceleration by using the front left wheel in the driving direction is expedient, because the greatest wheel load can be produced there during deceleration of the vehicle.

Furthermore, a subset of the wheel brakes may also be determined by joint consideration of the direction of movement of the vehicle and a determined driving operating mode.

According to one embodiment, the selective deceleration by using a subset of the wheel brakes is easily possible if the valve device has inlet valves which are arranged between the wheel brakes and the pressure-providing device and by which the wheel brakes can be disconnected from the pressure-providing device.

According to an associated preferred embodiment, for applying a pressure to the subset of the wheel brakes by the pressure-providing device, then the inlet valves of the wheel brakes that are not included in the subset are closed and the inlet valves of the wheel brakes that are included in the subset are opened and the pressure-providing device is activated for building up the pressure.

According to a further embodiment, the pressure-providing device is a dual-circuit piston pump.

In a further aspect, the invention relates to a control unit for a brake system of a vehicle, the brake system having an electrically operable pressure-providing device and a plurality of hydraulic wheel brakes, which are connected to the pressure-providing device and respectively assigned to a wheel of the vehicle. The control unit is in this case designed to establish a braking requirement, determine a vehicle speed, check whether the vehicle speed lies below a fixed limit value, if the vehicle speed lies below the limit value select a subset of the wheel brakes and activate the brake system in such a way that pressure is applied by the pressure-providing device exclusively to the subset of the wheel brakes.

According to a preferred embodiment, the brake system has a valve device, which has inlet valves which are arranged between the wheel brakes and the pressure-providing device and by which the wheel brakes can be disconnected from the pressure-providing device, the control unit being designed to activate the valve device for applying a pressure to the subset of the wheel brakes in such a way that the inlet valves of the wheel brakes included in the subset are opened and the inlet valves of the wheel brakes not included in the subset are closed.

BRIEF DESCRIPTION OF THE DRAWINGS

Preferred exemplary embodiments are explained in more detail below on the basis of the figures, in which.

In the text which follows, features that are similar or identical are denoted by the same reference signs.

DETAILED DESCRIPTION OF THE PREFERRED EMBODIMENTS

Figure 1:
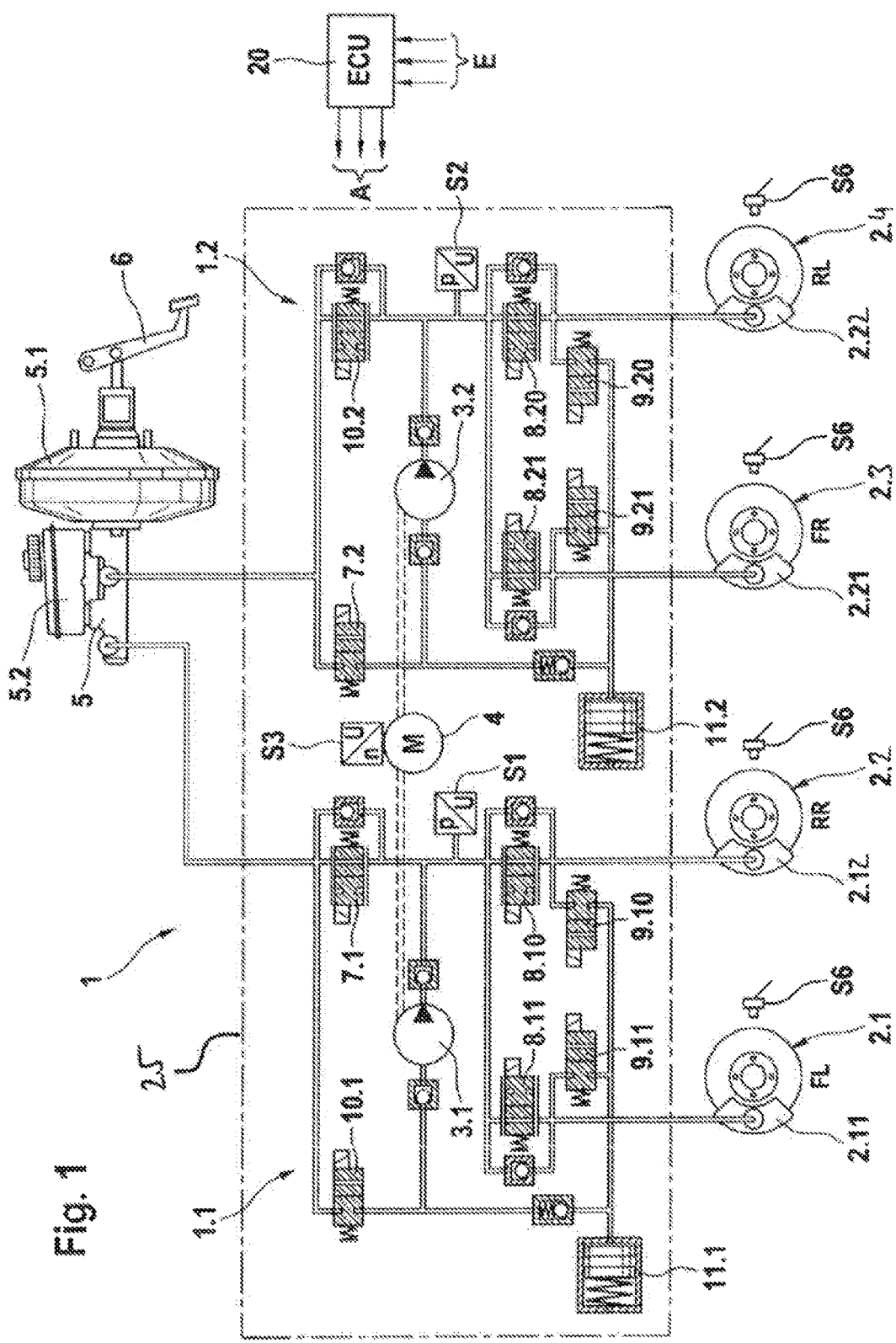
FIG. 1 shows a schematic representation of a hydraulic brake system.

FIG. 1 shows an electronically controlled hydraulic brake system 1 of a vehicle with a hydraulic brake control unit 25, which has an electrical pressure-providing device and a valve device with a multiplicity of valves. The brake system 1 also has an electronic brake control unit 20, which on the basis of sensor signals E and other signals as input signals generates control signals as output signals A for the pressure-providing device and the valves. The wheel brakes 2.11 and 2.12 or 2.21 and 2.22 of the wheels 2.1, 2.2, 2.3 and 2.4 are respectively connected to the brake control unit 25 via a hydraulic line. A first brake circuit 1.1 of the brake control unit 25 is assigned to a front left wheel 2.1 (FL) and a rear right wheel 2.2 (RR) and a second brake circuit 1.2 of the brake control unit 25 is assigned to a front right wheel 2.3 (FR) and a rear left wheel 2.4 (RL).

The brake system 1 also has a brake booster 5.1, which is connected to a master brake cylinder 5 configured as a tandem master cylinder, and a storage reservoir 5.2 for the brake fluid or the hydraulic fluid as the pressure medium. On the outlet side, the master brake cylinder 5 generates a brake pressure P as a feed pressure in accordance with a brake pedal 6, which is connected to the brake booster 5.1 and is actuated by a driver. The master brake cylinder 5 is connected to the brake circuits 1.1 and 1.2 of the brake control unit 25. The brake control unit 25 comprises for each brake circuit 1.1, 1.2 an isolation valve 7.1, 7.2, which is connected on the input side to the master brake cylinder 5 and on the output side to inlet valves 8.10 and 8.11 or 8.20 and 8.21 of the corresponding brake circuit 1.1 or 1.2, respectively. The inlet valves 8.10 and 8.11 as well as 8.20 and 8.21 are for example configured as normally open.

According to the example, normally closed outlet valves 9.10 and 9.11 of the first brake circuit 1.1 connect the wheel brakes 2.11 and 2.12 to a low-pressure reservoir 11.1, which, for its part, is connected to the intake of a hydraulic pump 3.1 as a pressure-providing device and can be connected via a changeover valve 10.1 to the master brake cylinder 5. Correspondingly, normally closed outlet valves 9.20 and 9.21 of the second brake circuit 1.2 connect the wheel brakes 2.21 and 2.22 to a low-pressure reservoir 11.2, which, for its part, is connected to the intake of a pressure-providing device 3.2 as a pressure source and can similarly be connected via a changeover valve 10.2 to the master brake cylinder 5. According to the example, the pressure-providing devices 3.1 and 3.2 are configured as dual-circuit piston pumps, in particular as dual-circuit eccentric piston pumps.

The hydraulic pumps 3.1 and 3.2 are driven by an electric motor 4, which is electrically controllable by the control unit 20. If the electric motor 4 is activated, the hydraulic pumps 3.1 and 3.2 take in pressure medium at the intake and deliver pressure medium on the high-pressure side. The brake pressure built up by the hydraulic pumps 3.1 and 3.2 is in each case measured by a pressure sensor S1, which is arranged in the first brake circuit 1.1, and another pressure sensor S2, which is arranged in the second brake circuit 1.2.

To detect the rotational behavior of the wheels 2.1, 2.2, 2.3 and 2.4, there are respective speed sensors S6, which feed their sensor signals to the control unit 20 for evaluation, for example to enable a corresponding slip control operation to be carried out at the wheels 2.1 to 2.4.

If, for example, as a consequence of an ESC intervention, there is a braking requirement for the first brake circuit 1.1, the brake control unit 25 is activated by the electronic control unit 20 by means of corresponding output signals A in such a way that first the isolation valve 7.1 is closed and the changeover valve 10.1 is opened. By corresponding activation of the motor 4, and consequently of the hydraulic pump 3.1, pressure medium is taken in from the storage reservoir 5.2 by the hydraulic pump 3.1 and fed via the open inlet valves 8.10 and 8.11 to the corresponding wheel brakes 2.11 and 2.12, so that the desired brake pressure is set in the wheel brakes 2.11 and 2.12.

The brake system described above is known per se from the prior art and is well suited for ABS control functions and ESC/driving stability functions. In addition, the brake control unit 25 described above is increasingly also being used for braking requirements for driving functions such as ACC. In particular at low speeds, often only low brake pressures are necessary for decelerating a vehicle. However, these low brake pressures often cannot be set with sufficient accuracy over all of the wheel brakes 2.11, 2.12, 2.21 and 2.22 by the brake control unit 25 during deceleration of the vehicle, so that jerky decelerations of the vehicle may occur. This situation is remedied by an aspect of the present invention.

The brake control unit 25 does not necessarily have to be used in the configuration represented in FIG. 1 of a hydraulic brake system with a brake booster 5.1. Rather, the brake control unit 25 may also be used in an electrohydraulic brake system in which a braking requirement is detected by pedal and pressure sensors and, on the basis of the sensor data detected, a corresponding brake pressure is built up by an electrically activated linear actuator.

Figure 2:
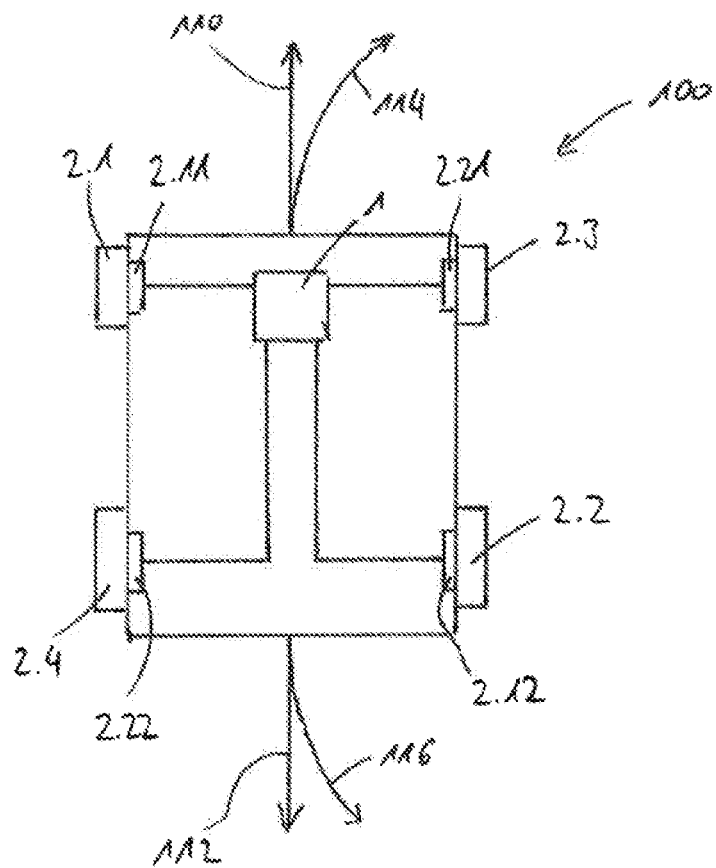
FIG. 2 shows a schematic representation of a vehicle and its directions of movement.

FIG. 2 shows a schematic representation of a vehicle 100, which is equipped with a brake system 1 according to FIG. 1. However, for reasons of overall clarity, only the brake system 1 and the hydraulic wheel brakes 2.11, 2.12, 2.21 and 2.22 connected to the brake system 1 are schematically represented here. In this case, the wheel brakes 2.11, 2.12, 2.21 and 2.22 are respectively assigned to the wheels 2.1, 2.2, 2.3 and 2.4 of the vehicle 100.

In FIG. 2, different variants for movement of the vehicle 100 are also indicated by the arrows 110, 112, 114 and 116. Apart from driving in the forward direction 110 and the reverse direction 112, cornering maneuvers with the steering wheel turned to the right are also indicated, once again a movement in the forward direction 114 and reverse direction 116 being respectively indicated.

Figure 3:
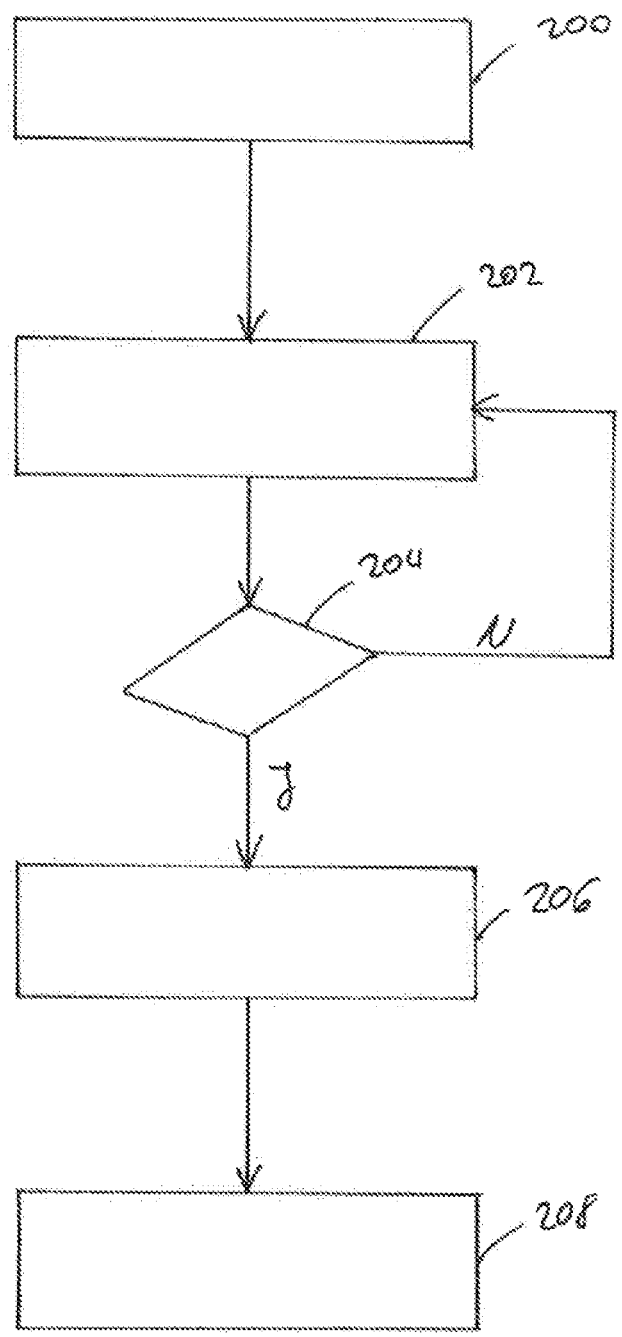
FIG. 3 shows a flow diagram of a method according to an aspect of the invention.

In the following text, a method according to an aspect of the invention is explained on the basis of the flow diagram of FIG. 3 considered together with FIG. 1 and FIG. 2.

In this case, a braking requirement is first established in a first method step 200. This may be both a braking requirement that is initiated by a driver of the vehicle 100 actuating the brake pedal 6 and a braking requirement that has been triggered by a driver assistance function. When there is an actuation of the brake pedal 6, the braking requirement may for example be detected on the basis of a pedal-travel sensor for the brake pedal 6 or on the basis of one of the pressure sensors S1 or S2.

Once the braking requirement has been detected, the speed of the vehicle 100 is subsequently determined in step 202. Information concerning the rotational speeds of the individual wheels 2.1 to 2.4, which is output by the wheel speed sensors S6, may be used for example for this.

Subsequently, it is checked in step 204 whether the vehicle speed determined lies below a defined limit value for the vehicle speed. The limit value may in this case be derived for example from a driving operating mode of the vehicle 100 at the time, that is to say for example a driving direction or an activated driver assistance program.

If it is thereby established that the vehicle speed has not gone below the limit value for it, the method returns to step 202 and the vehicle 100 is decelerated by using all of the wheel brakes 2.11, 2.12, 2.21 and 2.22.

If, on the other hand, it is established that the vehicle speed has gone below the limit value for it, a subset of the wheel brakes 2.1 to 2.4 that is to be used for the deceleration of the vehicle 100 is selected in step 206. The subset may for example comprise three, two or only one of the four wheel brakes 2.11, 2.12, 2.21, 2.22. It may in this case be provided that the subset depends on the driving direction of the vehicle 100. If the vehicle 100 is moving forward, that is to say in the direction of the arrow 110, the two wheel brakes 2.11 and 2.21 of the wheels 102 and 106 of the vehicle front axle are selected. This has the advantage that, during the braking operation, a dynamic wheel load distribution takes place, which allows greater deceleration at the wheels 102 and 106. Equally, in the case of driving in reverse in direction 112, deceleration by using the wheel brakes 2.22 and 2.12 of the vehicle rear axle would be expedient.

If, on the other hand, it is established that the steering of the vehicle 100 has been turned to the right and the vehicle is moving forward (direction 114), the wheel brake 2.11 of the front left wheel 2.1 may be resorted to for the deceleration of the vehicle 100, since here the greatest deceleration values can be achieved. Equally, in the case of driving in reverse along the direction 116, deceleration by using the wheel brake 2.22 of the rear left wheel 2.4 may be expedient.

After selection of the subset of the wheel brakes 2.11, 2.12, 2.21, 2.22, then in step 208 the vehicle is decelerated by applying a pressure by the pressure-providing device, according to the example the hydraulic pumps 3.1 and 3.2, exclusively to the subset of the wheel brakes 2.11, 2.12, 2.21, 2.22. For the selective application of pressure to the selected subset of the wheel brakes 2.11, 2.12, 2.21, 2.22, preferably the inlet valves 8.10, 8.11, 8.20 and 8.21 of those wheel brakes 2.11, 2.12, 2.21, 2.22 that are not included in the subset are closed, while the wheel brakes 2.11, 2.12, 2.21, 2.22 that are included in the subset are supplied with pressure by the pressure-providing device via the open inlet valves 8.10, 8.11, 8.20, 8.21.

The invention claimed is:

1. A method for avoiding jerking moments during deceleration of a vehicle by means of a brake system, the brake system having at least one electrically operable pressure-providing device, a plurality of hydraulic wheel brakes, which are connected to the pressure-providing device and respectively assigned to a wheel of the vehicle, and a valve device, the valve device being designed to apply a pressure provided by the pressure-providing device to a selectable subset of the wheel brakes, the method comprising:
   establishing a braking requirement,
   determining a vehicle speed,
   checking whether the vehicle speed lies below a defined limit value,
   selecting a subset of the wheel brakes when the vehicle speed lies below the limit value, and
   applying a pressure by the pressure-providing device exclusively to the selected subset of the wheel brakes, the pressure being determined according to the selected subset of the wheel brakes.

2. The method as claimed in claim 1, wherein the braking requirement is a braking requirement specified by an automatic driving function, in particular an automatic parking aid.

3. The method as claimed in claim 1, wherein the method also comprises establishing a driving operating mode, the limit value of the vehicle speed being fixed by the driving operating mode that is established.

4. The method as claimed in claim 1, wherein the method comprises the determination of a direction of movement of the vehicle, the subset of the wheel brakes being selected according to the direction of movement determined.

5. The method as claimed in claim 1, wherein the valve device has inlet valves which are arranged between the wheel brakes and the pressure-providing device and by which the wheel brakes can be disconnected from the pressure-providing device.

6. The method as claimed in claim 5, wherein, for applying a pressure to the subset of the wheel brakes by the pressure-providing device, the inlet valves of the wheel brakes that are not included in the subset are closed and the inlet valves of the wheel brakes that are included in the subset are opened and the pressure-providing device is activated for building up the pressure.

7. The method as claimed in claim 1, wherein the pressure-providing device is a dual-circuit piston pump.

8. A control unit for a brake system of a vehicle, the brake system comprising:
   an electrically operable pressure-providing device, and
   a plurality of wheel brakes, which are connected to the pressure-providing device and respectively assigned to a wheel of the vehicle,
   wherein the control unit is designed:
      to establish a braking requirement,
      to determine a vehicle speed,
      to check whether the vehicle speed lies below a defined limit value,
      to select a subset of the wheel brakes when the vehicle speed lies below the limit value, and
      to activate the brake system in such a way that a pressure is applied by the pressure-providing device exclusively to the selected subset of the wheel brakes, the pressure being determined according to the selected subset of the wheel brakes.

9. The control unit as claimed in claim 8, wherein the brake system has a valve device, which has inlet valves which are arranged between the wheel brakes and the pressure-providing device and by which the wheel brakes can be disconnected from the pressure-providing device, the control unit being designed to activate the valve device for applying a pressure to the subset of the wheel brakes in such a way that the inlet valves of the wheel brakes included in the subset are opened and the inlet valves of the wheel brakes not included in the subset are closed.

* * * * *

UNITED STATES PATENT AND TRADEMARK OFFICE
CERTIFICATE OF CORRECTION

| | |
|---|---|
| PATENT NO. | : 12,017,630 B2 |
| APPLICATION NO. | : 17/439278 |
| DATED | : June 25, 2024 |
| INVENTOR(S) | : Jochen Zimmermann and Takeshi Katayama |

It is certified that error appears in the above-identified patent and that said Letters Patent is hereby corrected as shown below:

On the Title Page

Item (73) Assignees: Change "Kanawawa (JP)" to --Kanagawa (JP)--.

Signed and Sealed this
Tenth Day of September, 2024

Katherine Kelly Vidal
*Director of the United States Patent and Trademark Office*